United States Patent [19]

Haralampiev et al.

[11] 4,045,184
[45] Aug. 30, 1977

[54] FLUIDIZED-BED REACTOR FOR CARRYING OUT CHEMICAL REACTIONS BETWEEN LIQUIDS AND SOLID GRANULATED SUBSTANCES

[75] Inventors: Georgi Alexandrov Haralampiev; Georgi Petrov Girdjev; Lyudmila Karlo Cheyka; Assen Parvanov Milenov, all of Sofia; Lyuben Rangelov Starev, Plovdiv; Georgi Ivanov Abrashev, Plovdiv; Ivaylo Yanev Grigorov, Plovdiv, all of Bulgaria

[73] Assignee: Kzm "D. Blagoev", Plovdiv, Bulgaria

[21] Appl. No.: 669,069

[22] Filed: Mar. 22, 1976

[30] Foreign Application Priority Data

Mar. 24, 1975   Bulgaria ................................ 29421

[51] Int. Cl.² .............................. B01J 8/20; C22B 3/02
[52] U.S. Cl. ......................................... 23/283; 23/285; 23/288 S; 23/273 R; 75/109; 134/25 R; 137/592; 141/284; 141/374; 141/388; 266/101; 266/170

[58] Field of Search ................. 23/288 S, 284, 273 R, 23/283; 34/10, 57 A; 423/659 F; 75/109; 266/101, 170; 134/25 R; 141/356, 374, 388, 284; 137/592

[56] References Cited

U.S. PATENT DOCUMENTS

| 2,653,858 | 9/1953 | Brown .......................... 23/273 R X |
| 2,740,752 | 4/1956 | Anhorn ........................ 23/288 S X |
| 2,995,426 | 8/1961 | Keith .............................. 23/284 X |
| 3,211,533 | 10/1965 | Witte ............................ 23/273 R |
| 3,479,020 | 11/1969 | Lefler et al. ................... 266/170 |
| 3,554,516 | 1/1971 | Denny et al. .................. 266/170 |

*Primary Examiner* — Joseph Scovronek
*Assistant Examiner* — Roger F. Phillips
*Attorney, Agent, or Firm* — E. Janet Berry; Lawrence Rosen

[57] ABSTRACT

A fluidized bed reactor adapted for carrying out chemical reactions between liquids and solid particles, having a design which provides stabilized hydrodynamic conditions within the reactor zones and thereby avoids the disadvantages of blockages of grid holes and passages in the system during operation. Fluid inlet tubes are provided which are slidably supported, with fluid outlets which rest on the bottom of the reactor, sealing against reverse flow, and which lift up due to hydraulic forces upon introduction of fluid to the reactor.

1 Claim, 1 Drawing Figure

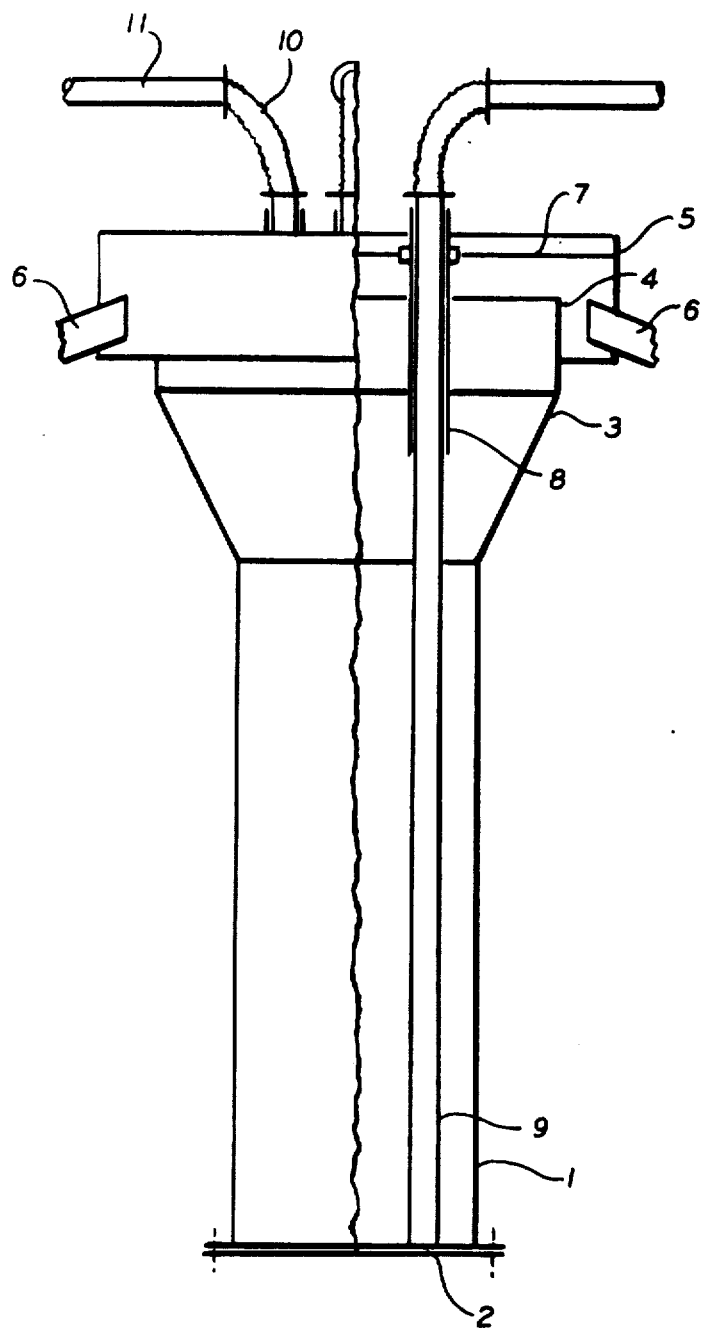

ately in vertical direction in the
FLUIDIZED-BED REACTOR FOR CARRYING OUT CHEMICAL REACTIONS BETWEEN LIQUIDS AND SOLID GRANULATED SUBSTANCES This invention relates to a fluidized-bed reactor for carrying out chemical reactions between liquids and solid granulated substances, which finds application in the chemical and metallurgical industry.

Fluidized-bed reactors are known, in which the liquid is delivered from the bottom of the reactor through a distributing grid. In the different designs of reactors, the distributing grids differ in the shape of the holes (round, rectangular, square, diffusor-like, etc.). If the liquid contains mechanical admixtures or it is a concentrated solution of salts, susceptible to crystallization, a gradual filling of the grid holes is observed leading to blocking, and as a result there is a change in the hydrodynamic conditions of the reactor and there arises the necessity to stop its operation for the purpose of cleaning.

There are also known fluidized-bed reactors with delivery of the liquid in their bottom through pipe connections, which are disposed tangentially on the side of the reactor or vertically below its bottom. When stopping the liquid flow towards the reactor, solid particles from the layer enter the pipe connection and block them. A cleaning of the pipe connections is necessary after each stopping and before each starting of the reactor.

The disadvantages of the known fluidized-bed reactors lie first of all and basically in their liquid-distributing devices. The manner of delivery of the liquid into the reactor of the fluidized-bed-type determines to a large degree the character of bubbling of the layer. When part of the holes of the distributing grid or some of the pipe connections of the different designs of reactors are blocked, this leads to a disturbance of the hydrodynamic conditions in the reactor. There are formed or increased the standstill areas, and the condition is pronounced spouting with pulses. In that condition, after a certain time the layer of solid particles changes over from "pseudoliquid" into "layed". For fluidized-bed reactors in which a chemical reaction with the formation of solid product takes place, the "laying" of the layer is accompanied by sticking together and enlargement of the solid particles.

It is therefore a general object of the present invention to avoid the disadvantages of the known reactors by providing a fluidized-bed reactor for carrying out chemical reactions between liquids and solid granulated substances, which provides a stability of the preset hydrodynamic conditions and a possibly most efficient operation of the reactor, which is featured by a simple and reliable design.

This object is achieved, in accordance with the present invention, by a fluidized-bed reactor for carrying out chemical reactions between liquids and solid granulated substances, which consists of a reaction cylinder with flat bottom, a transition, an upper cylinder and an overflow cylinder with overflow gutters, which is characterized by that onto the supporting frame, fastened to the walls of the overflow cylinder, there are attached guiding sleeves, into which there are disposed movable pipes, which touch the bottom of the reaction cylinder and are connected in their upper end by means of a flexible connection to the pressure pipe conduit for the fluidizing liquid. If no liquid is pumped or the discharge is small, then the pipes touch the bottom of the reactor and close the access for solid particles into the pipe conduit. The flexible connection of the pipes with the pressure pipe conduit provide a possibility for motion in vertical direction.

The advantages of the fluidized-bed reactor, in accordance with the present invention, lie in that there is eliminated the penetration of solid particles in the pipe conduits which deliver the liquid, there are provided stable hydrodynamic conditions and a continuous operation of the reactor even with liquids, containing mechanical admixtures, with concentrated salt solutions susceptible to crystallization and when carrying out in the reactor a chemical reaction, accompanied by the formation of a solid product.

For a better understanding of the invention, its operating advantages and specific objects attained by its use, reference should be made to the accompanying drawing in which there is illustrated and described a preferred embodiment of the invention. The drawing is a longitudinal cross-sectional view of the reactor of the invention.

The reactor comprises a reaction cylinder 1 with bottom 2, which is connected by means of a transition 3 with an upper cylinder 4. The upper cylinder 4 is disposed partially in the volume of the overflow 5, which is provided with overflow gutters 6. To the walls of the upper cylinder 4 there is fastened the supporting frame 7, onto which there are fastened the guiding sleeves 8, through which there pass the pipes 9, which are connected to the pressure pipe conduits 11 by means of the flexible connections 10.

The fluidized-bed reactor, in accordance with the present invention, operates as follows. Pipes 9 touch the bottom 2 of the reactor. The liquid is pumped in pipes 9 through the pipe conduits 11 and the flexible connections 10. As a result of the reactive force of the flow and the presence of the flexible connections 10, pipes 9 are detached from the bottom 2 and the liquid is distributed horizontally and subsequently in vertical direction in the space of the reactor, and at that the granulated solid material changes into a fluidized state. At the contact between the liquid and the granulated solid material a chemical reaction takes place, and the product obtained by it is entrained by the entering flow of the liquid, making free the surface of the solid material, and, through the overflow cylinder 5 and the overflow gutters 6, it is discharged outside the reactor. The distance between the end of the pipes 9 and the bottom 2 of the reactor is determined by the total pressure of the fluid inside the pipes 9 and that in the bottom layer in the reactor, or from the hydraulic resistance of the bubbling layer, respectively. Each change in the hydrodynamic resistance of the bubbling layer causes a displacement of pipes 9 in vertical direction, influences the velocity of the flow of the liquid inside the pipes and vice versa. These conditions provide for the maintainance of preset hydrodynamic conditions inside the reactor in determined limits.

One of the tested applications of the reactor is for cementation of copper and cadmiun in solution.

What we claim is:

1. A fluidized-bed reactor for carrying out chemical reactions between liquids and solid granulated substances, comprising a reaction cylinder having a flat bottom, and having a pressure pipe conduit for fluidizing liquid disposed therein, a transition zone, an upper cylinder and an overflow cylinder with overflow gutters positioned at the upper and outward position thereof, said reaction cylinder connected to said upper cylinder and said overflow cylinder by said transition zone a supporting frame positioned and fastened to the walls of said overflow cylinder guiding sleeves fastened to said supporting frame; vertically moveable pipes disposed inside said guiding sleeves and arranged to touch the bottom of said reaction cylinder at their outlet so as to form a seal against reverse flow, said vertically moveable pipes connected by means of flexible connectors to said pressure pipe conduit for the fluidizing liquid whereby upon introduction of said fluidizing liquid through said pressure pipe conduit, said flexible connectors, and said vertically moveable pipes, the pipes will lift to balance hydraulic forces allowing fluid to flow into said reaction cylinder, and whereby upon termination of liquid introduction said vertically moveable pipes will return to a sealing position against said bottom by force of gravity.

* * * * *